(12) United States Patent
Lathim

(10) Patent No.: US 8,640,648 B2
(45) Date of Patent: Feb. 4, 2014

(54) MEDIA APPARATUS

(76) Inventor: Del Lathim, Pasco, WA (US)

(*) Notice: Subject to any disclaimer, the term of this patent is extended or adjusted under 35 U.S.C. 154(b) by 151 days.

(21) Appl. No.: 12/904,837

(22) Filed: Oct. 14, 2010

(65) Prior Publication Data

US 2011/0088629 A1 Apr. 21, 2011

Related U.S. Application Data

(60) Provisional application No. 61/252,038, filed on Oct. 15, 2009.

(51) Int. Cl.
*A01K 29/00* (2006.01)

(52) U.S. Cl.
USPC .......................................................... 119/165

(58) Field of Classification Search
USPC .................... 119/161, 165, 166, 72
See application file for complete search history.

(56) References Cited

U.S. PATENT DOCUMENTS

| 3,111,932 | A  | * | 11/1963 | Knutson | 119/165 |
|---|---|---|---|---|---|
| 5,058,528 | A  | * | 10/1991 | Counseller et al. | 119/165 |
| 5,365,879 | A  | * | 11/1994 | Ying-Kuan | 119/54 |
| 6,079,361 | A  | * | 6/2000 | Bowell et al. | 119/72 |
| 6,467,428 | B1 | * | 10/2002 | Andrisin et al. | 119/51.5 |
| 6,971,331 | B1 | * | 12/2005 | Rohrer | 119/77 |
| 7,040,249 | B1 | * | 5/2006 | Mushen | 119/51.5 |
| 2006/0196438 | A1 | * | 9/2006 | Caputa et al. | 119/165 |
| 2009/0199778 | A1 | * | 8/2009 | Kratzer et al. | 119/165 |

* cited by examiner

*Primary Examiner* — Son T Nguyen
*Assistant Examiner* — Kathleen Alker
(74) *Attorney, Agent, or Firm* — Rainier Patents, P.S.; Paul W. Mitchell

(57) ABSTRACT

The present description relates to a media apparatus that can function as an animal litter box. In one case, the media apparatus includes a media storage portion configured to define a media receiving volume. The media apparatus also includes an animal support portion that defines an opening proximate the media receiving volume.

10 Claims, 7 Drawing Sheets

MEDIA APPARATUS 100(1)

MEDIA APPARATUS 100(1)

MEDIA APPARATUS 100(1)

MEDIA APPARATUS 100(1)

US 8,640,648 B2

MEDIA APPARATUS

PRIORITY

This patent application is a non-provisional utility application that claims priority from provisional application 61/252,038, filed on Oct. 15, 2009.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

The present description relates to a media apparatus that can function as an animal litter box. For example, the media apparatus can be utilized as a litter box for domestic cats, among others.

Figure 1:
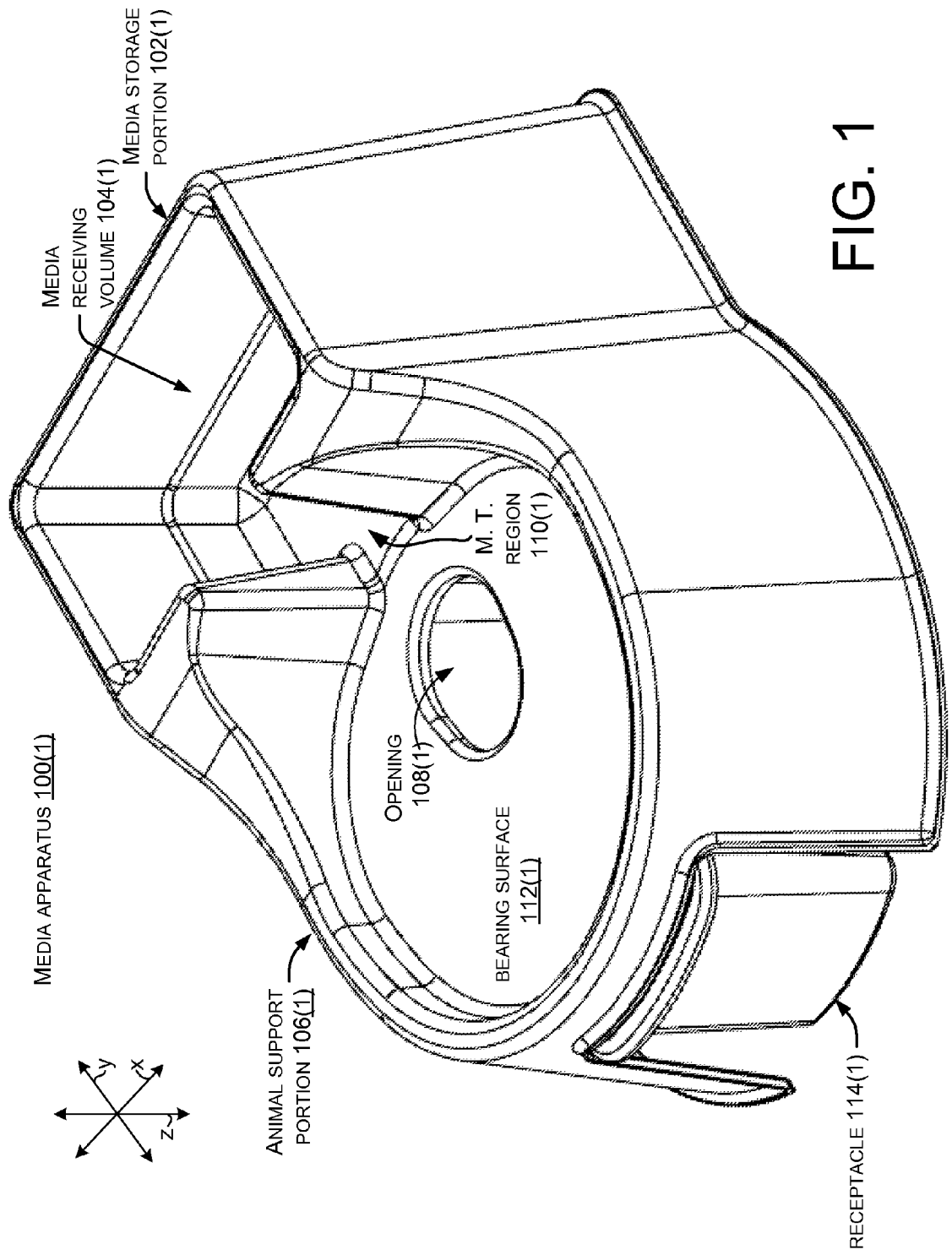
FIG. 1 is a perspective view of an example of a media apparatus in accordance with some of the present concepts.
Figure 2:
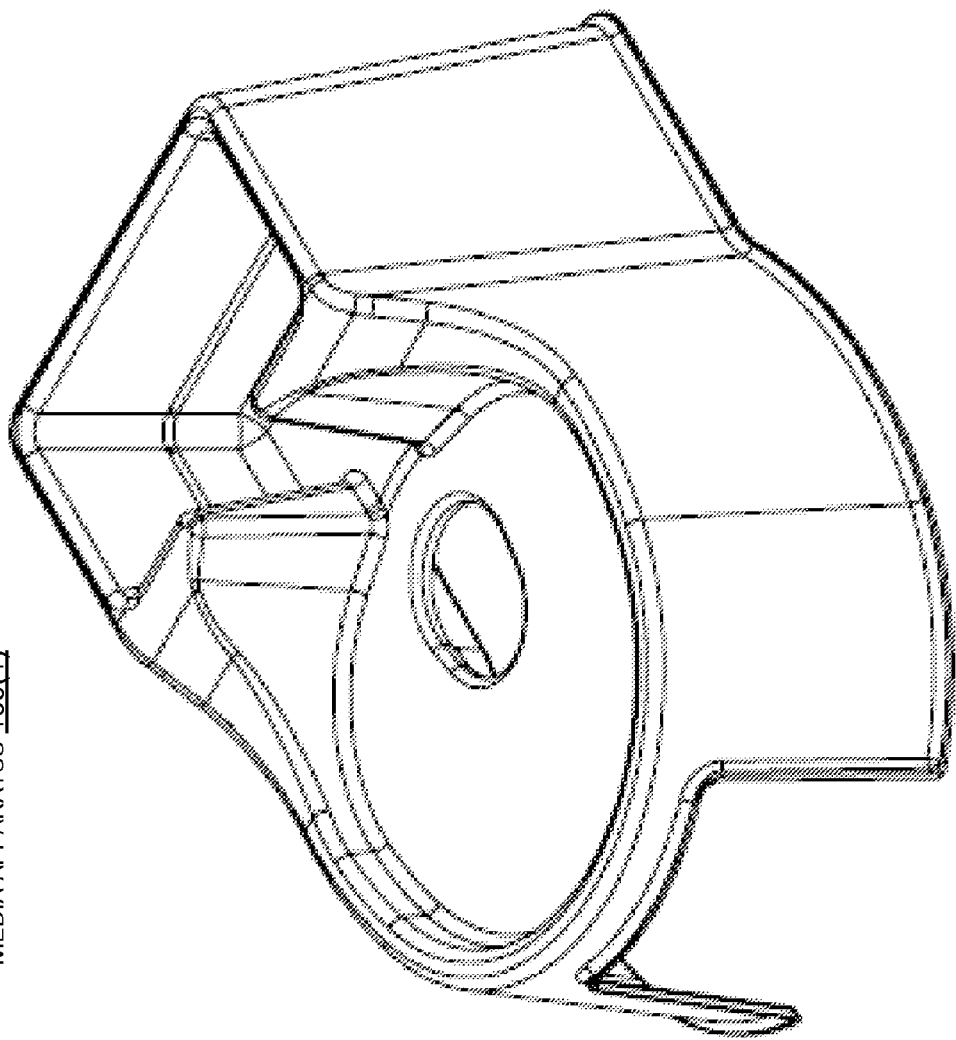
FIG. 2 is a perspective view of an example of a media apparatus with a receiver removed in accordance with some of the present concepts.
Figure 3:
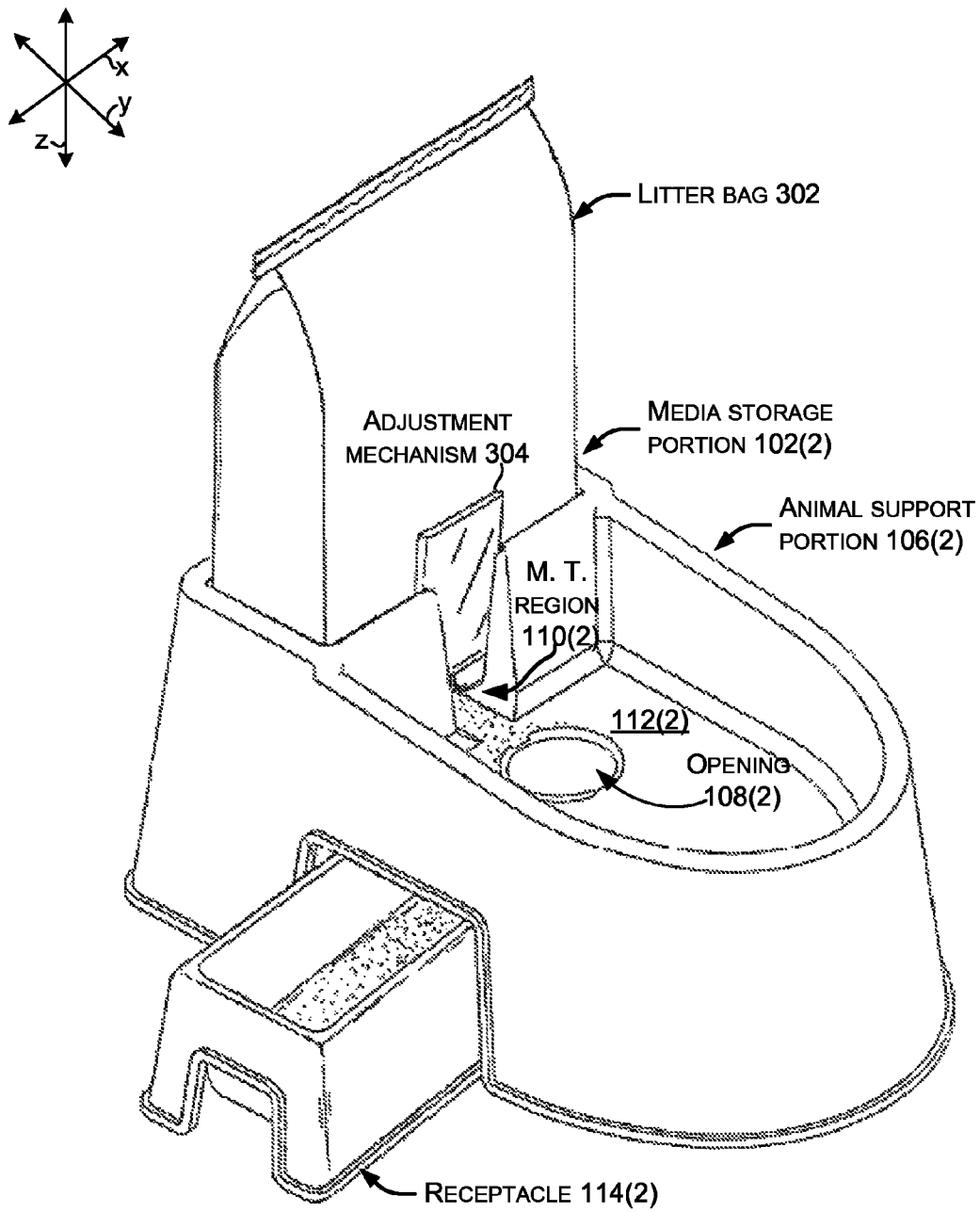
FIG. 3 is a perspective view of an example of a media apparatus in accordance with some of the present concepts.
Figure 4:
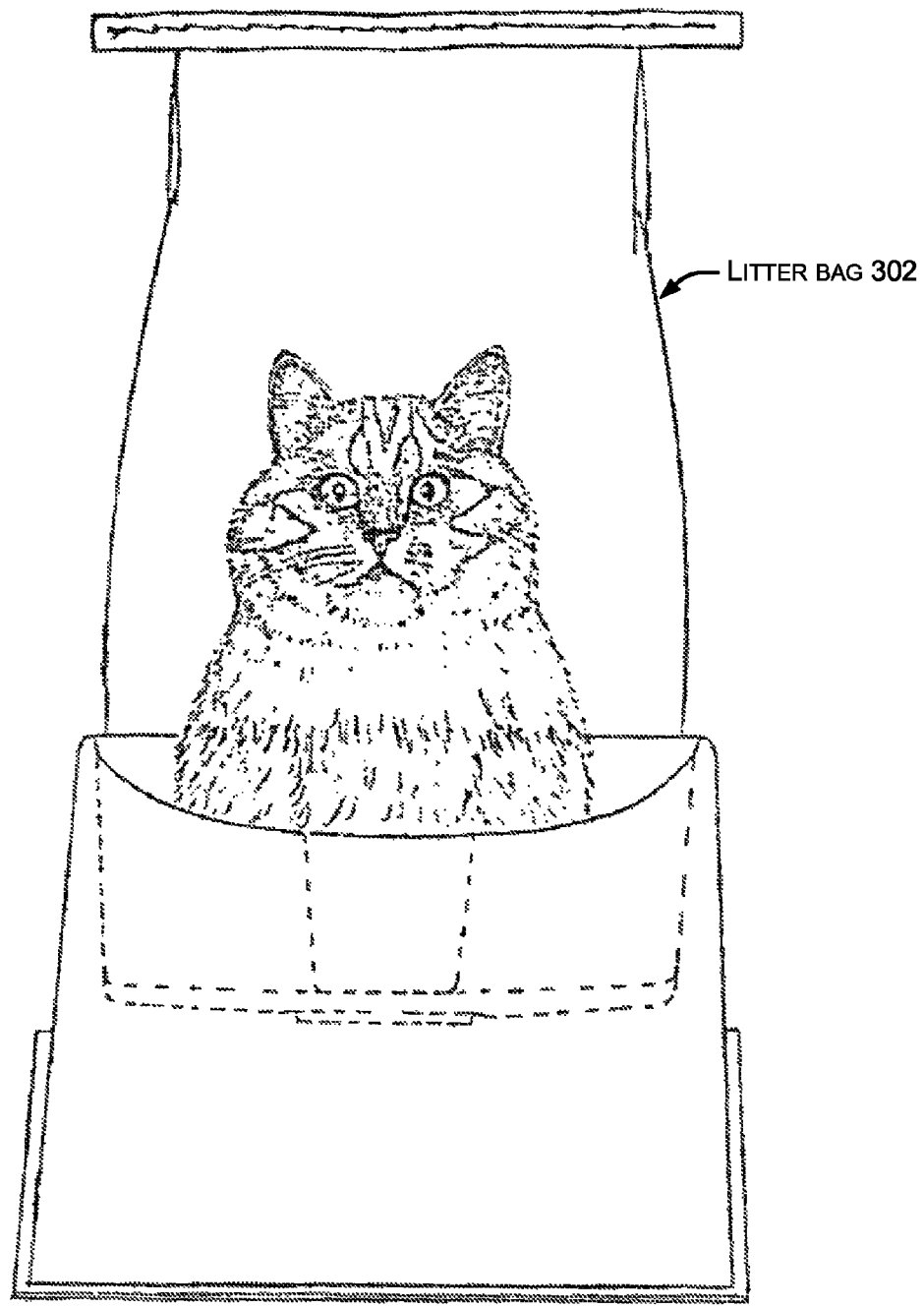
FIG. 4 is an elevational view of an example of a media apparatus in accordance with some of the present concepts.
Figure 5:
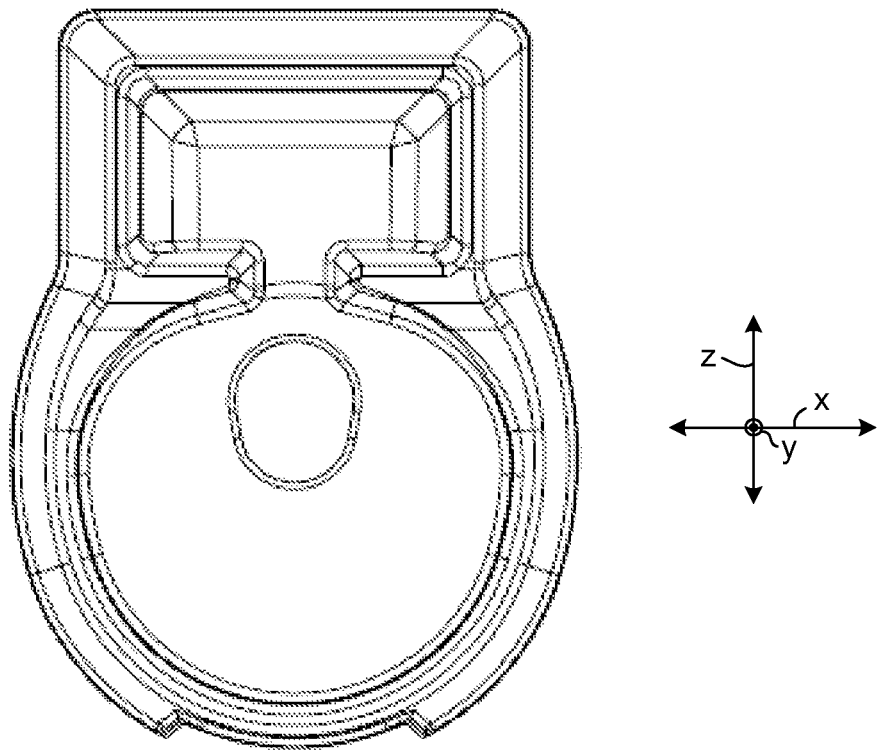
FIG. 5 is a top view of an example of a media apparatus in accordance with some of the present concepts.
Figure 6:
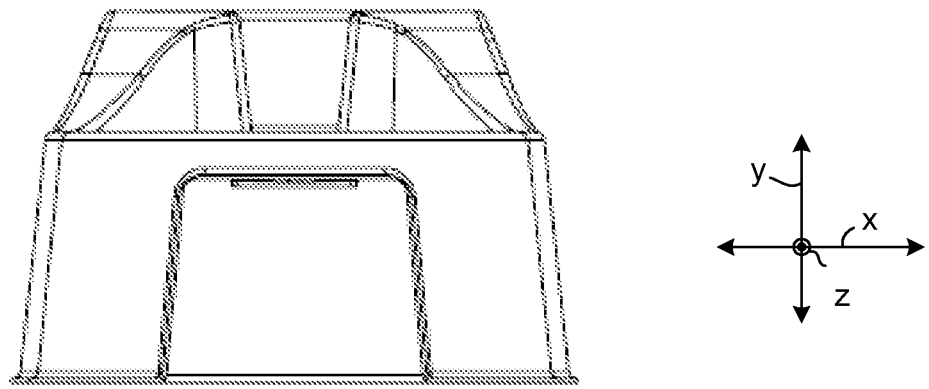
FIG. 6 is an elevational view of an example of a media apparatus in accordance with some of the present concepts.
Figure 7:
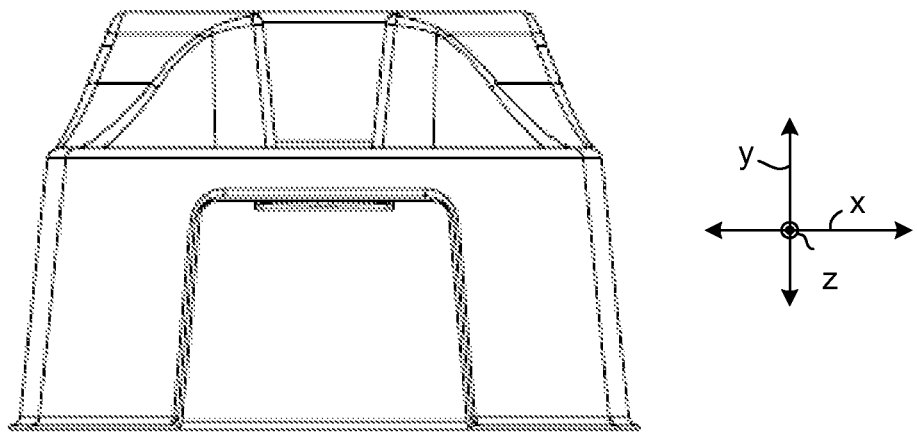
FIG. 7 is an opposite elevational view of FIG. 4 of an example of a media apparatus in accordance with some of the present concepts.
Figure 8:
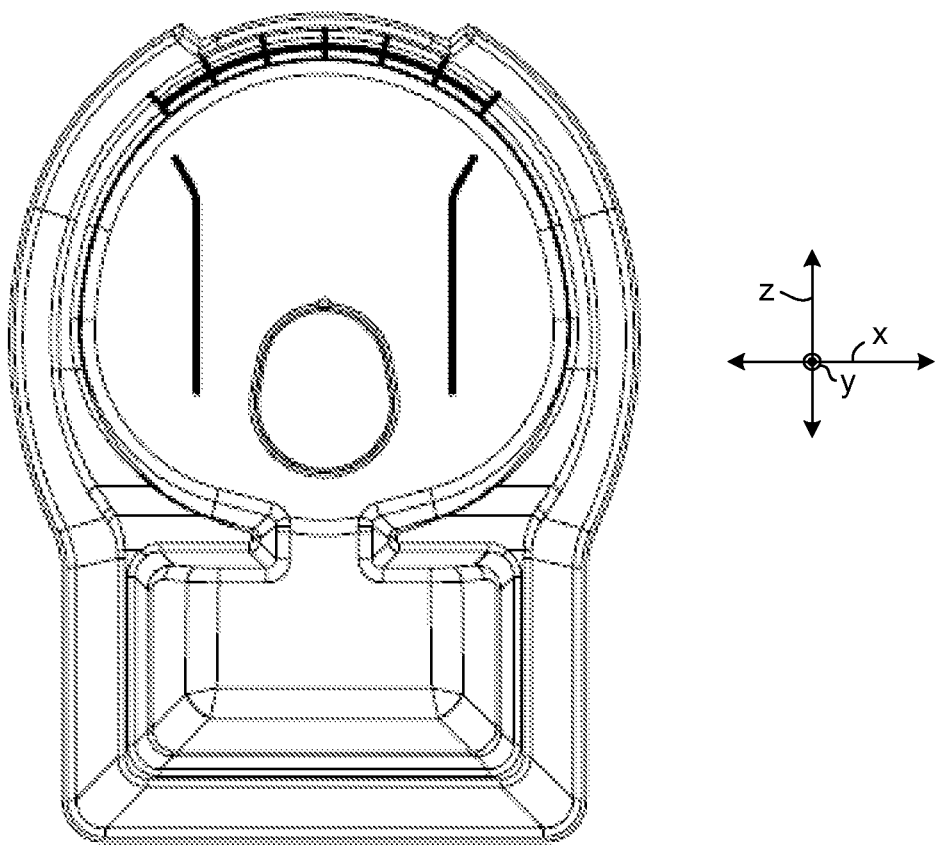
FIG. 8 is an opposite view of FIG. 3 that shows the underside of an example of a media apparatus in accordance with some of the present concepts.
Figure 9:
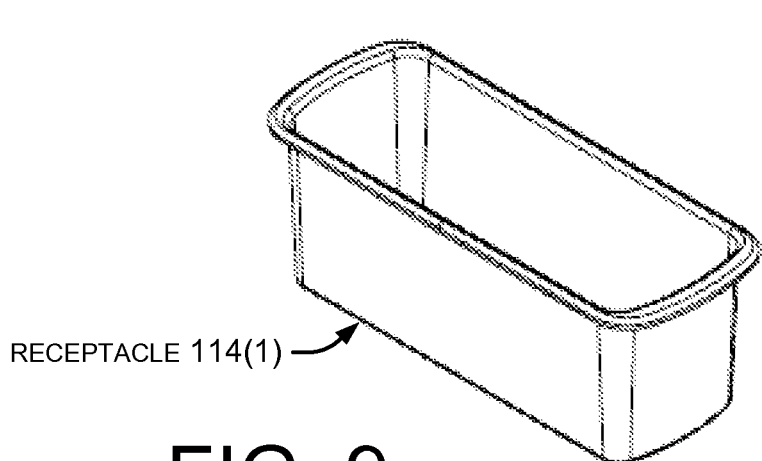
FIG. 9 is a perspective view of an example of a receiver in accordance with some of the present concepts.
Figure 10:
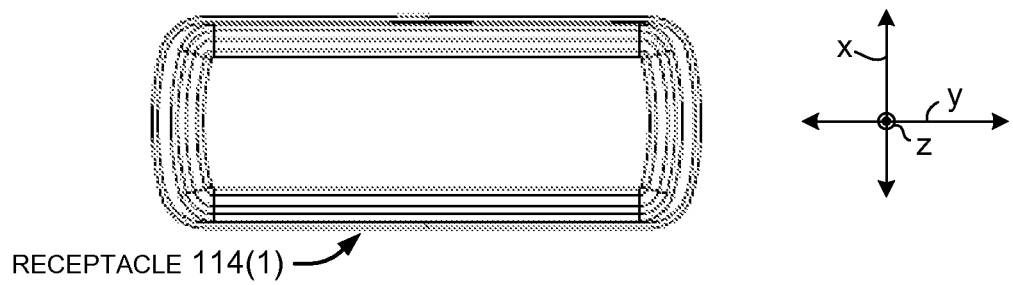
FIG. 10 is a top view of an example of a receiver in accordance with some of the present concepts.
Figure 11:
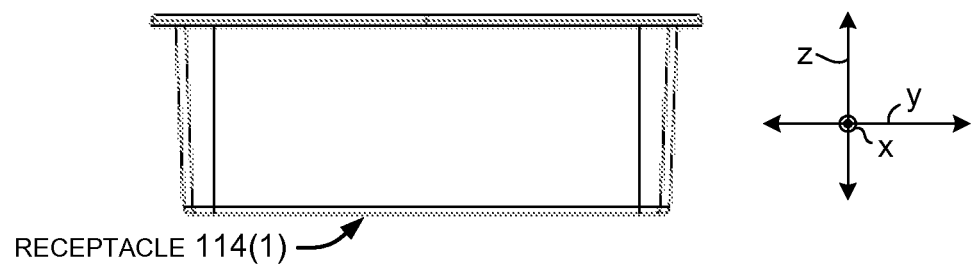
FIG. 11 is an elevational view of an example of a receiver in accordance with some of the present concepts.

FIGS. 1-2 show an example of a media apparatus 100(1). FIGS. 3-4 show an example of another media apparatus 100(2). FIGS. 5-11 show media apparatus 100(1) in more detail.

FIGS. 1-2 show media apparatus 100(1) which can include a media storage portion 102(1) configured to define a media receiving volume 104(1). As will become apparent from FIGS. 3-4, the size of the media receiving volume can be selected to accommodate readily available bags of media. Media apparatus 100(1) can also include an animal support portion 106(1) that defines an opening 108(1) proximate the media receiving volume 104(1). The animal support portion 106(1) can be open to the media storage portion 102(1) at a media transfer region 110(1). In this case, the animal support portion can include a bearing surface 112(1) upon which an animal can stand to perform a bodily function through the opening 108(1). In some implementations, the bearing surface 112(1) can be flat. In other implementations, the bearing surface can be sloped toward the opening 108(1). In some cases the bearing surface can have a smooth finish and in other cases the bearing surface can be textured to avoid slipping.

The media transfer region 110(1) can allow an animal to transfer media from the media storage portion to the bearing surface 112(1) and ultimately through opening 108(1) and into a receptacle 114(1).

FIGS. 3-4 show another media apparatus 100(2). Media apparatus 100(2) can have at least some components that are similar to media apparatus 100(1) and are distinguished with the suffix "2" but are otherwise not addressed with specificity. In FIGS. 3-4 media in the form of litter bag 302 is shown in the volume defined by media storage portion 102(2). Once inserted in the media storage portion 102(2), a hole can be cut into litter bag 302 proximate the media transfer region 110(2). This implementation further includes an adjustment mechanism 304 for adjusting media transfer from litter bag 302 to animal support portion 106(2). (In the implementation shown in FIGS. 1-2, the size of the hole in the litter bag can be used to affect media transfer.)

In use, an animal such as a cat can scratch a small amount of litter from litter bag 302 to bearing surface 112(2). The cat can then relieve itself in opening 108(2) while standing on the bearing surface. The cat can follow its instinct and try to cover up its waste with litter by scratching more litter from the litter bag.

Receptacle 114(2) can be lined with a disposable plastic garbage bag that may or may not be scented. The bag can be easily removed and deposited in the garbage, as needed.

At least some of the present implementations can offer several potential advantages. For instance, no hood is required with media apparatus 100(2) because the odor has been eliminated. No cleaning pad is required because the cat generally does not touch the soiled litter. Further, the purchase of large, heavy bags of litter is not needed because a 10 lb. bag of litter can last over 3 months per cat. Cats enjoy using the media apparatus and cat owners enjoy pleasing their cats. The media apparatus can be inexpensive, easy to use, and sanitary. It can take up less space than other litter boxes on the market today.

Media apparatus 100 can be constructed of any suitable material such as a polymer, plastic, or composite. Any traditional fabrication technique, such as injection molding can be utilized to form the media apparatus. In some configurations, such as those illustrated relative to FIGS. 1-11, the media apparatus can be constructed in a manner that allows multiple media apparatus to be stacked in a nested manner, such as for space savings during shipping.

CONCLUSION

Although specific examples of media apparatus are described in language specific to structural features, it is to be understood that the subject matter defined in the appended claims is not intended to be limited to the specific features described. Rather, the specific features are disclosed as exemplary forms of implementing the claimed statutory classes of subject matter.

The invention claimed is:
1. A media apparatus, comprising:
 a media storage portion that defines a media receiving volume, wherein the media receiving volume is sized to accommodate a readily available bag of media;

an animal support portion that includes a bearing surface with an opening proximate the media receiving volume, wherein the animal support portion has a sidewall surrounding the bearing surface, wherein the sidewall is configured to prevent media from spilling out of the media apparatus;

a media transfer region formed in the sidewall and configured to allow an animal to transfer media from the media storage portion to the bearing surface, wherein the sidewall completely and continuously surrounds the bearing surface except for where the sidewall defines the media transfer region; and a receptacle located below the opening for receiving therein the media and bodily substances deposited by the animal in the opening, wherein the sidewall at the media transfer region is angled such that a top end of the media transfer region is wider than a lower end of the media transfer region, and further wherein the media transfer region extends continuously to a top most edge of the sidewall and is open at the top end.

2. The media apparatus of claim 1, wherein the animal support portion is open to the media storage portion at the media transfer region.

3. The media apparatus of claim 2, wherein the animal support portion includes the bearing surface upon which the animal can stand to perform a bodily function through the opening and wherein the animal can retrieve media through the media transfer region before or after performing the bodily function.

4. The media apparatus of claim 3, wherein the bearing surface is sloped downwardly from the sidewall toward the opening.

5. The media apparatus of claim 1, further configured to be nestably stackable with another different media apparatus.

6. The media apparatus of claim 1, wherein the media apparatus is formed as a single piece or multiple pieces.

7. The media apparatus of claim 1, wherein the media apparatus is produced by a molding process.

8. The media apparatus of claim 1, wherein the media apparatus is formed from a polymer, plastic, or composite.

9. The media apparatus of claim 1, further comprising an adjustment mechanism for controlling media flow through the media transfer region.

10. The media apparatus of claim 1, wherein the opening includes a lip that extends downwardly from the bearing surface around a perimeter of the opening.

* * * * *